US012502002B2

(12) United States Patent
Gramse et al.

(10) Patent No.: US 12,502,002 B2
(45) Date of Patent: Dec. 23, 2025

(54) METHOD FOR ANALYZING SOUND DATA FOR USE IN AN ANTI-SNORING SYSTEM AND APPARATUS

(71) Applicant: SKY BACON TECHNOLOGY HOLDINGS, LLC, Logan, UT (US)

(72) Inventors: Jason R. Gramse, Nibley, UT (US); Erfan Reed, Smithfield, UT (US)

(73) Assignee: SKY BACON TECHNOLOGY HOLDINGS, LLC, Logan, UT (US)

( * ) Notice: Subject to any disclaimer, the term of this patent is extended or adjusted under 35 U.S.C. 154(b) by 988 days.

(21) Appl. No.: 17/388,427

(22) Filed: Jul. 29, 2021

(65) Prior Publication Data

US 2022/0047088 A1 Feb. 17, 2022

Related U.S. Application Data

(60) Provisional application No. 63/064,635, filed on Aug. 12, 2020.

(51) Int. Cl.
| | |
|---|---|
| *A47C 20/04* | (2006.01) |
| *A61B 5/00* | (2006.01) |
| *G06N 3/04* | (2023.01) |

(52) U.S. Cl.
CPC .......... *A47C 20/041* (2013.01); *A61B 5/4812* (2013.01); *A61B 5/4818* (2013.01); *A61B 5/7264* (2013.01); *G06N 3/04* (2013.01)

(58) Field of Classification Search
CPC ... A47C 20/041; A61B 5/4812; A61B 5/4818; A61B 5/7264; A61B 7/003; G06N 3/04; G06N 3/045; G06N 3/048; G06N 3/08
See application file for complete search history.

(56) References Cited

U.S. PATENT DOCUMENTS

| | | | |
|---|---|---|---|
| 2015/0073306 A1* | 3/2015 | Abeyratne | G16H 50/30 600/586 |
| 2016/0120740 A1* | 5/2016 | Rawls-Meehan | A47C 31/008 601/49 |
| 2019/0099009 A1 | 4/2019 | Connor | |

OTHER PUBLICATIONS

International Search Report and Written Opinion of the International Searching Authority for International Patent App. No. PCT/US2021/044721 dated as mailed on Nov. 16, 2021 (7 pages).

* cited by examiner

*Primary Examiner* — Tarla R Patel
(74) *Attorney, Agent, or Firm* — David R. Conklin; Kirton McConkie

(57) ABSTRACT

An anti-snoring system comprising an adjustable bed having a sleeping surface that may be mechanically raised or lowered, and a control module adapted to receive commands from a source external to the adjustable bed; a mobile device in direct or indirect communication with the control module in the adjustable bed, and wherein the mobile device has sound recording capabilities; a mobile application resident on the mobile device, wherein the mobile application includes a sound classification machine learning model that includes an artificial intelligence or neural network operative to determine whether or not a person on the sleep surface is snoring, and wherein upon a determination that the person is snoring and has been snoring for a predetermined period of time, the mobile application instructs the control module to raise or adjust the sleeping surface to a height or position that will discourage the person from snoring.

19 Claims, 1 Drawing Sheet

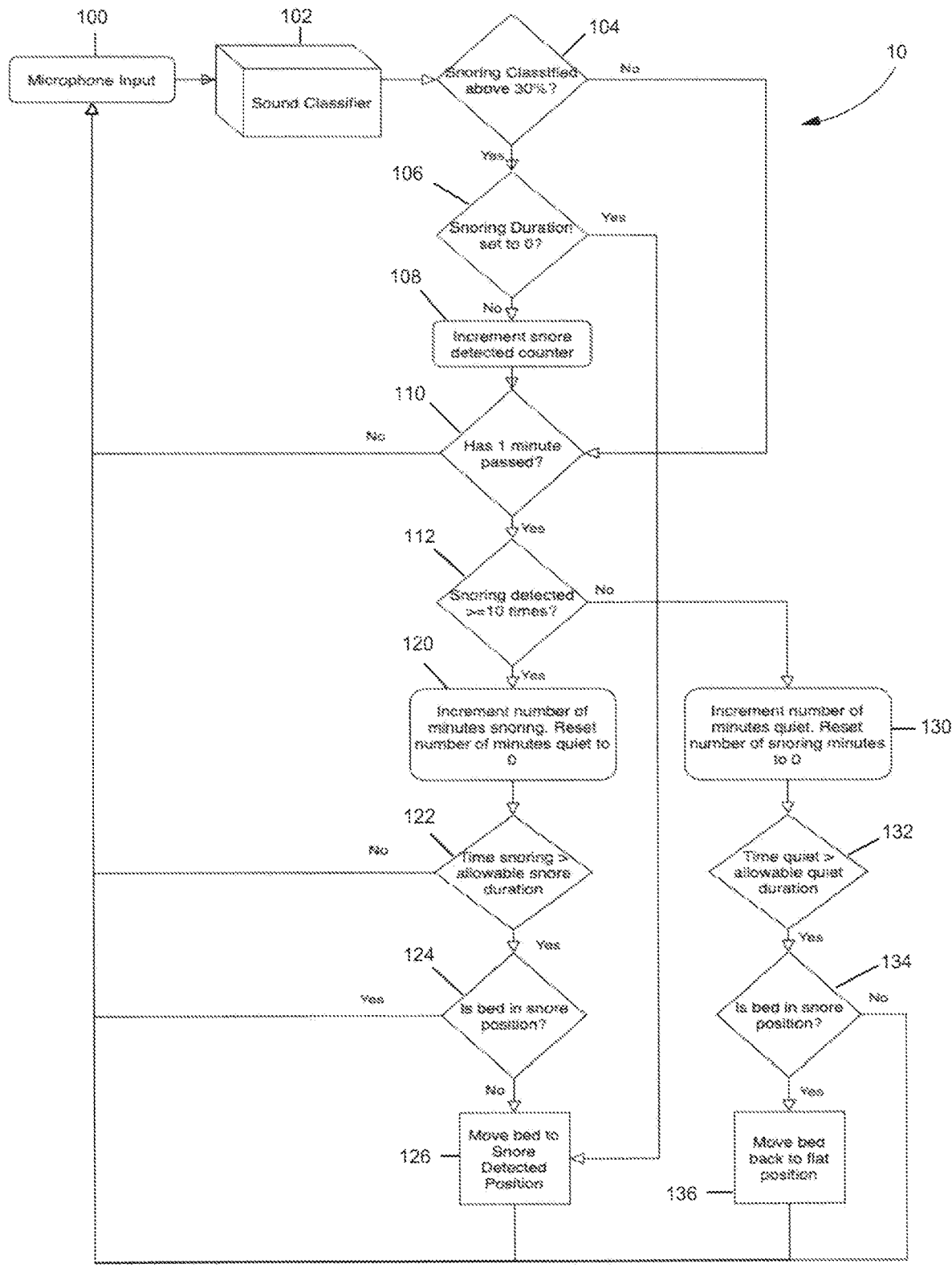

METHOD FOR ANALYZING SOUND DATA FOR USE IN AN ANTI-SNORING SYSTEM AND APPARATUS

CROSS-REFERENCE TO RELATED APPLICATIONS

This patent application claims the benefit of U.S. Provisional Patent Application Ser. No. 63/064,635 filed on Aug. 12, 2020 and entitled "Method for Analyzing Sound Data for Use in an Anti-Snoring System and Apparatus," the disclosure of which is hereby incorporated by reference herein in its entirety and made part of the present U.S. utility patent application for all purposes.

BACKGROUND

The disclosed inventive subject matter relates in general to anti-snoring systems, devices, and methods, and more specifically to an analytical method for use in an anti-snoring system that includes an adjustable bed or similar item that may be raised or lowered based on commands received from a mobile device running a mobile application that analyzes specific types of sound data.

Snoring is a very common problem in modern society. Snoring affects the physical and mental health of many individuals, male and female, because it can interfere with proper breathing and prevent or significantly interfere with obtaining healthy and restorative sleep. Adjustable beds and mattresses are commercially available from many sources and provide the users thereof with the ability to raise or lower portions of such mattresses as desired. Because snoring tends be more severe when an individual is lying flat on their back, it would be useful to have a system and method for detecting snoring once it begins and then automatically adjusting the mattress upward to reduce the likelihood of snoring.

SUMMARY

The following provides a summary of certain example implementations of the disclosed inventive subject matter. This summary is not an extensive overview and is not intended to identify key or critical aspects or elements of the disclosed inventive subject matter or to delineate its scope. However, it is to be understood that the use of indefinite articles in the language used to describe and claim the disclosed inventive subject matter is not intended in any way to limit the described inventive subject matter. Rather the use of "a" or "an" should be interpreted to mean "at least one" or "one or more".

One implementation provides an anti-snoring system. This anti-snoring system comprises an adjustable bed, wherein the adjustable bed includes a sleeping surface that may be mechanically raised or lowered, and wherein the adjustable bed includes a control module adapted to receive commands from a source external to the adjustable bed; a mobile device, wherein the mobile device is in direct or indirect communication with the control module in the adjustable bed, and wherein the mobile device has sound recording capabilities; a mobile application resident on the mobile device, wherein the mobile application includes a sound classification machine learning model that includes an artificial intelligence or neural network operative to determine whether or not a person on the sleep surface is snoring, and wherein upon a determination that the person is snoring and has been snoring for a predetermined period of time, the mobile application instructs the control module in the adjustable bed to reposition the sleeping surface to discourage or stop the person from snoring. The mobile device may be a smart phone or computer tablet. The artificial intelligence or neural network may comprise sound data collection algorithms, system control algorithms, and a sound database. The mobile application may be an Android-based application or an iOS-based application. The direct communication between the mobile device and control module may be Bluetooth®-based and the indirect communication between the mobile device and control module is network-based.

Another implementation provides a first anti-snoring, sleep improvement system. This system comprises an adjustable sleeping surface that may be mechanically raised or lowered, and wherein the adjustable sleeping surface includes a control module adapted to receive commands from a source external to the adjustable sleeping surface; at least one mobile device, wherein the at least one mobile device is in direct or indirect communication with the control module in the adjustable sleeping surface, and wherein the at least one mobile device has sound recording capabilities; a mobile application resident on the at least one mobile device, wherein the mobile application includes sound data collection algorithms, system control algorithms, and a sound database operative to determine whether or not a person on the adjustable sleeping surface is snoring, and wherein upon a determination that the person is snoring and has been snoring for a predetermined period of time, the mobile application instructs the control module in the adjustable sleeping surface reposition the sleeping surface to discourage or stop the person from snoring. The adjustable sleeping surface may be mounted on a bed frame. The at least one mobile device may be a smart phone or computer tablet. The sound data collection algorithms, system control algorithms, and sound database may comprise a neural network. The mobile application may be an Android-based application or an iOS-based application. The direct communication between the mobile device and control module may be Bluetooth®-based and the indirect communication between the mobile device and control module may be network-based.

Still another implementation provides a second anti-snoring, sleep improvement system. This system comprises an adjustable sleeping surface that may be mechanically raised or lowered, and wherein the adjustable sleeping surface includes a control module adapted to receive commands from a source external to the adjustable sleeping surface; a mobile device, wherein the at least one mobile device is a smartphone that is in direct or indirect communication with the control module in the adjustable sleeping surface, and wherein the smartphone has sound recording capabilities; a mobile application resident on the smartphone, wherein the mobile application includes sound data collection algorithms, system control algorithms, and a sound database operative to determine whether or not a person on the adjustable sleeping surface is snoring, wherein the mobile application is either an Android-based application or an iOS-based application, and wherein upon a determination that the person is snoring and has been snoring for a predetermined period of time, the mobile application instructs the control module in the adjustable sleeping surface to reposition the sleeping surface to discourage or stop the person from snoring. The adjustable sleeping surface may be mounted on a bed frame. The sound data collection algorithms, system control algorithms, and sound database may comprise a neural network. The direct communication between the mobile device and control module may be Bluetooth®-based and the indirect communication between the mobile device and control module may be network-based.

It should be appreciated that all combinations of the foregoing concepts and additional concepts discussed in greater detail below (provided such concepts are not mutually inconsistent) are contemplated as being part of the inventive subject matter disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed inventive subject matter and, together with the general description given above and detailed description given below, serve to explain the principles of the disclosed subject matter, and wherein:

FIG. I is a flowchart of an example implementation of the disclosed system and method for changing the configuration of an adjustable bed to minimize or prevent snoring.

DETAILED DESCRIPTION

Example implementations are now described with reference to the Figures.

Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed inventive subject matter. Accordingly, the following implementations are set forth without any loss of generality to, and without imposing limitations upon, the claimed subject matter.

Implementations of the disclosed technology provide a method for analyzing sound data for use in an anti-snoring system and apparatus. The anti-snoring system includes a mobile application resident on mobile device, wherein the mobile application includes a learning module or artificial intelligence (AI) that analyzes sound data and determines whether or not the sound data is indicative of snoring. If the sound data is determined to be snoring and occurs for a predetermined period of time, the mobile application communicates with the bed in which a snoring person is sleeping and instructs the bed to change positions to stop the person from snoring or reduce the likelihood that the person will continue to snore. Beds compatible with the disclosed technology include any bed that includes Bluetooth® capabilities. This includes Structures E450, E455, M455 M550, M555, M655, M750, M755 (Malouf), Lucid Base L300 (with Bluetooth® dongle) and L600, Dr. Oz brands Good Life Base, and Good Life Pro Base and any other base having Bluetooth® capabilities. Such beds include a control box mounted underneath that can be communicated with by Bluetooth® for use with mobile applications (apps). Other implementations utilize different connectivity types such as Wi-Fi, direct connection between system components, and various commercially know wireless technologies.

The "sound classification machine learning model" disclosed herein analyzes audio data to determine whether or not someone is snoring. If snoring is detected for a user specified number of minutes, the user's adjustable bed base is then moved to a preset position, normally 'Anti-Snore', to elevate the users head preventing snoring. If the user desires and the machine learning model determines the user is no longer snoring for a user specified number of minutes, the bed will then lower back down to the flat position.

The sound classification machine learning model is an aspect of a mobile application that may be adapted for use on either the Android platform or the iOS platform. As used herein, a mobile application, also referred to as a mobile app or simply an app, is a computer program or software application designed to run on a mobile device such as a phone, tablet, or watch. Apps are generally downloaded from application distribution platforms which are operated by the owner of the mobile operating system, such as the App Store (iOS) or Google Play Store. Mobile applications often stand in contrast to desktop applications which are designed to run on desktop computers, and web applications which run in mobile web browsers rather than directly on the mobile device. In other implementations, the sound classification machine learning model is an aspect of a computer application that is resident on a device other than a phone, tablet, or watch. In some implementations, such non-mobile devices may be accessed by multiple users of the system.

For iOS users, audio data is analyzed every 975 milliseconds. For Android users, audio data is analyzed every 3 seconds. Audio data is sampled at 16000 Hz, Single Channel PCM format and then fed into the machine learning model as an array of floating-point numbers. For iOS, each sample contains 15600 floating point numbers. For Android, each sample contains 48000 floating point numbers.

The output of the machine learning model on iOS is either Snoring or Not Snoring. The output of the machine learning model on Android is either Unknown, Silence, Not Snoring, or Snoring. With regard to output, the determination is more of a probability distribution than an either-or output. For example, and output could be 10% chance of snoring and a 90% chance of not snoring. If the user has selected O minutes for the duration of snoring required before moving, the app will send the move to preset command immediately after snoring has been detected. Otherwise, the number of minutes of snoring or not snoring will be accumulated.

Snoring must be classified above 30% confidence a minimum of 10 times in a minute to indicate a full minute of snoring. If snoring is detected 9 times or less in a minute, that minute is considered Not Snoring. After a minute has passed, if snoring has been detected 10 times or more, the app increments the number of minutes snoring and resets the number of minutes not snoring to 0. Otherwise, the app increments the number of minutes Not Snoring and resets the number of minutes of snoring to 0. If the number of minutes snoring is incremented to meet the duration specified by the user, the bed is issued the move command. Similarly, if the bed has been moved previously and the number of minutes Not Snoring is incremented to meet the duration specified by the user, a command is issued the move the bed back to a flat position.

Two classes of data were created: (a) a first class for snoring, containing 2602 sound samples; and (b) a second class for not snoring, containing 8950 sound samples of noises including everything other than snoring audio. All audio data was preprocessed at 16000 Hz sample rate, single channel pcm format and cut at 3 seconds worth of audio.

In example implementations, snore samples were chosen if they were at least 400 milliseconds long, at most 3 seconds long, and loudness above-30 dB. Silent audio data was used to pad snore samples on either end so that the snoring audio was centered in a full 3 second audio clip.

The iOS machine learning model was created using Apple's CreateML developer tool. The Sound Classifier model was chosen. Data was split into 90% training data and 10% testing data, trained with a maximum number of iterations of 25, and an overlap factor of 50%. Validation Data was left at Automatic. Validation achieved an accuracy of 99%, test data was 95%.

The android model was built using TensorFlow lite. The model is a convolution neural network using I-dimensional convolution consisting of 50 separate layers outlined below. The input is 3 seconds worth of audio data at 16000 Hz sampling rate (48000 floating point numbers). The output is an array of four numbers indicating the probability that the sound was either Silence, Unknown, Snoring, or Not Snoring.

FIG. I provides a flowchart of an example implementation of the disclosed system and method for changing the configuration of an adjustable bed to minimize or prevent snoring. As illustrated by FIG. 1, system/method 10 includes the following aspects: microphone input 100; sound classifier 102; decision step 104, wherein snoring is classified above 30%; decision step 106, wherein snoring duration is set to O; process step 108, involving an increment snore detection counter; decision step 110, involving the determination of the passage of a predetermined period of time (e.g., one minute); and decision step 112, involving the determination of whether snoring has been detected more than a predetermined number of time (e.g. IO times). If the answer at step 112 is yes, the next step is process step 120, involving determining an increment number of minutes of snoring and resetting the number of minutes quiet to O; decision step 122, involving a determination of whether time snoring is greater than a predetermined allowable snore duration; decision step 124 involving a determination of whether the bed is the "snore" position; and process step 126, which involves moving the bed to the "snore detected position". If the answer at step 112 is no, the next step is process step 130, involving determining an increment number of minutes quiet and then resetting the number of snoring minutes to O; decision step 132, involving a determination of whether time quiet is greater than a predetermined allowable quiet duration; decision step 124 involving a determination of whether the bed is the "snore" position; and process step 126, which involves moving the bed back to the "flat position".

A model system architecture describes activity inside the machine learning model, which is essentially an artificial intelligence. This information below applies to the Android model and an example model architecture includes the following layers:

Input layer=
Reshaped=[800, 60]
ID convolution (32 filters, k=I where k is kernel width)→output=[800, 32]
BatchNormalization (normalizes the activations of the previous layer)→[800, 32]
Relu6 Activation (rectified linear activation function, returns value if value>0, else 0 with a max value of 6)→[800, 32]
ID convolution (48 filters, k=3)→output=[798, 48]
BatchNormalization→output=[798, 48]
Relu6 activation→output=[798, 48]
MaxPooling ID (pool size=3, strides=2, no padding, looks at 3 filters at a time, choose the max vector, toss out the other 2 and shift down 2 vectors for next pass)→output=[398, 48]
ID convolution (48 filters, k=3)→output=[396, 48]
BatchNormalization→output=[396, 48]
Relu6 Activation→output=[396, 48]
ID convolution (96 filters, k=3)→output=[394, 96]
BatchNormalization→output=[394, 96]
Relu6 activation→output=[394, 96]
MaxPooling ID→output=[196, 96]
ID convolution (96 filters, k=3)→output=[194, 96]
BatchNormalization→output=[194, 96]
Relu6 Activation→output=[194, 96]
ID convolution (128 filters, k=3)→output=[192, 128]
BatchNormalization→output=[192, 128]
Relu6 activation→output=[192, 128]
MaxPooling ID→output=[95, 128]
ID convolution (128 filters, k=3)→output=[93, 128]
BatchNormalization→output=[93, 128]
Relu6 Activation→output=[93, 128]
ID convolution (160 filters, k=3)→output=[91, 160]
BatchNormalization→output=[91, 160]
Relu6 activation→output=[91, 160]
MaxPooling ID→output=[45, 160]
ID convolution (160 filters, k=3)→output=[43, 160]
BatchNormalization→output=[43, 160]
Relu6 Activation→output=[43, 160]
ID convolution (192 filters, k=3)→output=[41, 192]
BatchNormalization→output=[41, 192]
Relu6 activation→output=[41, 192]
MaxPooling ID→output=[20, 192]
ID convolution (192 filters, k=3)→output=[18, 192]
BatchNormalization→output=[18, 192]
Relu6 Activation→output=[18, 192]
ID convolution (256 filters, k=3)→output=[16, 256]
BatchNormalization→output=[16, 256]
Relu6 activation→output=[16, 256]
MaxPooling ID→output=[7, 256]
ID convolution (256 filters, k=3)→output=[5, 256]
BatchNormalization→output=[5, 256]
Relu6 Activation→output=[5, 256]
Dropout (rate=0.3)→output=[5, 256]
ID convolution (4 filters, k=5, softmax activation)→output=[I, 4]
Reshape [-1]→output=[4]

In this model, the Mini-Batch Gradient Descent was utilized, which is an optimization algorithm used to find a set of internal model parameters that give desirable results. These internal parameters are used to make predictions on obtained samples. These predictions are compared at the end of each batch to the expected outputs and an error is calculated. This error is then used to update the internal parameters (or weights) for the next batch to move down the error gradient until the error is as small as possible. The Batch Size is the number of sound samples processed before updating the model's parameters during training. The number of Epochs is the number of complete passthroughs of the training dataset. Batch size and epochs are set to 32 and 100 respectively. It is not possible to know optimal numbers for these hyper-parameters, but through many tests these values appeared to produce the best results. The output of the epoch that produced the best results (lowest errors) was chosen for the example model.

The 25% Silence Percentage determines how much of the training data is silence. If silence is not added to the training data, the model will have a difficult time processing silence and will misclassify it as something else. The 10% Validation Percentage determines how much of the training data will be used for validation and this data is used to determine or evaluate the fit of a model and to update parameters during training.

A sound sample is sent through all the layers of the model before generating the predictions. Example sound samples use herein are 3 seconds long at 16000 Hz; meaning the input sample or Input Layer is a single row of data, 48000 data points long (3×16,000). This data is then Reshaped to 800×60 (60×800=48000). This reshaped layer is then passed through a ]-dimensional convolution layer. This first convolutional layer has 32 Filters or feature maps which sets the number of times the input is processed or interpreted. The results of these interpretations are the number of outputs the data will have once convolution is complete. The kernel width k specifies the window size of the convolution window or the number of input steps considered as the input sequence. In the first ID convolution, the kernel width is set to 1. After convolution, the data now has a shape of 800×32.

The Batch Normalization layer transforms the inputs so that the inputs will have a mean of 0 and a standard deviation of 1. This drastically improves the speed of training by avoiding internal covariate shift and does not affect the shape of the input, so the output remains 800×32.

The next layer is the Relu6 activation layer. The activation function defines an output for a given input. The ReLU activation function is a commonly used activation layer that simply outputs the input if it is positive, or zero otherwise. The ReLU6 function used herein is similar except that it caps positive values at 6. The ReLU activation is used because it is easier to train and achieves better performance in most cases. This layer, again, leaves the shape of the data unchanged.

Three layers: (i) ID Convolution, (ii) Batch Normalization, and (iii) Relu6 Activation form a grouping, which may be referred to as ConvID, that repeats a number of times with increased numbers of Filters in the I-dimensional convolution layer. The first group of ConvID is executed with 32 filters and a kernel size of 1. As discussed above, this results in an output shape of 800×32. The second group of ConvID is executed with 48 filters and kernel size of 3. The kernel size of 3 means that during convolution, 3 numbers are summed together and output. The kernel window is then shifted over I and the next 3 numbers are summed together and output. This alters the shape of the output because the last 2 convolution steps will not have 3 numbers to sum so they are omitted from the outputs. An example is shown in TABLE 1 below with input data of size 11, and kernel size of 3. This results in an output data of size 9 as the last two operations do not have 3 numbers to sum. In a model with an input shape of 800, the output will be 798. With the filter size of 48, the output of this second convolution is of size 798×48.

After the second grouping of ConvID, aMaxPooling layer is applied to the input with a pool size of 3 and a stride of 2. The max pooling layer observes three (pool size) vectors of data, chooses the max, and discards the other 2. It then shifts 2 (stride) vectors and repeats until all inputs have been considered. This results in an output shape of 398×48.

The grouping ConvID is applied twice more, with a filter size of 48 and 96. Output shape is now 394×96

Another MaxPooling layer for an output shape of 196×96

The grouping ConvID is applied twice more, with a filter size of 96 and 128. Output shape is now 192×128

Another MaxPooling layer for an output shape of 95×128

The grouping ConvID is applied twice more, with a filter size of 128 and 160. Output shape is now 91×160

Another MaxPooling layer for an output shape of 45×160

The grouping ConvID is applied twice more, with a filter size of 160 and 192. Output shape is now 41×192

Another MaxPooling layer for an output shape of 20×192

The grouping ConvID is applied twice more, with a filter size of 192 and 256. Output shape is now 16×256

Another MaxPooling layer for an output shape of 7×256

The grouping ConvID is applied once more with a filter size of 256. Output shape is now 5×256

Another layer is now introduced, a Dropout layer with a rate of 0.3. The Dropout layer randomly sets input units to 0 with a frequency of rate, which helps prevent overfitting. Inputs not set to O are scaled up by 1/(1-rate) so that the sum of all the inputs remains the same. This layer is only used during training to prevent overfitting, not during inference (when real data is being analyzed). This does not change the output shape of 5×256.

One, I-dimension convolution with only 4 filters remains, kernel width set to 5, but this time using a softmax activation function. This activation function returns a probability distribution, or the probability that the sound sample that has passed through all the previous layers corresponds to one of the classes: unknown, silence, snoring, not-snoring. These probabilities are passed through one more reshape layer to return the 4 probabilities in the correct order and format and compared against the known class of the sound sample. This is where errors are computed, and parameters are updated to obtain a better result.

As previously described, 32 samples (batch size) are trained before parameters are analyzed and updated, and all 11,552 sound samples in the data set are run through 100 times (epochs). Once the model is trained, meaning all I 00 epochs have been passed through, the epoch that produced the best results is used and model is generated from the final parameters of this epoch. This model can then be fed data from the mobile device's microphone. This is the Sound Classifier appearing in the flow chart of FIG. 1.

In certain implementations, example model settings include (i) Epochs: 100; (ii) Batch Size: 32; (iii) Window Size: 500; (iv) Window Stride: 100; (v) DCT Coefficients: 80; (vi) Number of Log Mel Features: 64; (vii) Silence Percentage: 25%; and (viii) Validation Percentage: 10%. However, these aspects are omitted from the model described above as these parameters are only used if sound samples are converted to a spectrogram and melspectrogram.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this specification are used to describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed inventive subject matter. Various functions and elements described herein may be partitioned differently from those shown without departing from the scope of the disclosed inventive subject matter. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the figures, only for facilitating description of the present invention and simplifying the description, rather than indicating or implying that the referred devices or elements must be in a particular orientation or constructed or operated in the particular orientation, and therefore they should not be construed as limiting the present invention. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the present invention may be understood according to specific circumstances.

It should be appreciated that all combinations of the foregoing concepts and additional concepts discussed in greater detail herein (provided such concepts are not mutually inconsistent) are contemplated as being part of the disclosed inventive subject matter. In particular, all combinations of claimed subject matter appearing at the end of this disclosure are contemplated as being part of the inventive subject matter disclosed herein. While the disclosed inventive subject matter has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed inventive subject matter in its broader aspects is not limited to any of the specific details, representative devices and methods, and/or illustrative examples shown and described. Accordingly, departures may be made from such details without departing from the spirit or scope of the general inventive concept.

What is claimed:

1. An anti-snoring system, comprising:
   (a) an adjustable bed, wherein the adjustable bed includes a sleeping surface that may be mechanically raised or lowered, and wherein the adjustable bed includes a control module adapted to receive commands from a source external to the adjustable bed;
   (b) a mobile device, wherein the mobile device is in direct or indirect communication with the control module in the adjustable bed, and wherein the mobile device has sound recording capabilities;
   (c) a mobile application resident on the mobile device, wherein the mobile application includes a sound classification machine learning model that includes an artificial intelligence or neural network operative to determine whether or not a person on the sleep surface is snoring;
   (d) upon a determination that the person is snoring and has been snoring for a predetermined period of time, the mobile application instructs the control module in the adjustable bed to reposition the sleeping surface to discourage or stop the person from snoring;
   (e) wherein the artificial intelligence or neural network comprises sound data collection algorithms, system control algorithms, and a sound database; and wherein
   (f) the sound data collection algorithms comprise a 1D convolution layer, a batch normalization layer, and a Relu6 activation layer.

2. The system of claim 1, wherein the mobile device includes a smart phone or computer tablet.

3. The system of claim 1, wherein an input to the mobile application is classified as unknown, silence, not snoring, or snoring.

4. The system of claim 1, wherein the mobile application is an iOS-based application.

5. The system of claim 1, wherein the artificial intelligence or neural network is trained on at least 32 batch sizes before parameters are analyzed and updated.

6. The system of claim 1, wherein after an allowable quiet duration, the mobile application instructs the control module in the adjustable bed to reposition the sleeping surface back to a flat position.

7. An anti-snoring, sleep improvement system, comprising:
   (a) an adjustable sleeping surface that may be mechanically raised or lowered, and wherein the adjustable sleeping surface includes a control module adapted to receive commands from a source external to the adjustable sleeping surface;
   (b) at least one mobile device, wherein the at least one mobile device is in direct or indirect communication with the control module in the adjustable sleeping surface, and wherein the at least one mobile device has sound recording capabilities;
   (c) a mobile application resident on the at least one mobile device, wherein the mobile application includes sound data collection algorithms, system control algorithms, and a sound database operative to determine whether or not a person on the adjustable sleeping surface is snoring, and wherein the sound data collection algorithms comprise a 1D convolution layer, a batch normalization layer, and a Relu6 activation layer; and wherein the mobile application includes a sound classification machine learning model that includes an artificial intelligence or neural network operative to determine whether or not a person on the adjustable sleeping surface is snoring, and (d) upon a determination that the person is snoring and has been snoring for a predetermined period of time, the mobile application instructs the control module in the adjustable sleeping surface to reposition the sleeping surface to discourage or stop the person from snoring.

8. The system of claim 7, wherein the adjustable sleeping surface is mounted on a bed frame.

9. The system of claim 7, wherein the at least one mobile device is a smart phone or computer tablet.

10. The system of claim 7, wherein the sound data collection algorithms, system control algorithms, and sound database comprise a neural network.

11. The system of claim 7, wherein an input to the mobile application is classified as unknown, silence, not snoring, or snoring.

12. The system of claim 7, wherein the mobile application is an iOS-based application.

13. The system of claim 7, wherein the artificial intelligence or neural network is trained on at least 32 batch sizes before parameters are analyzed and updated.

14. The system of claim 7, wherein after an allowable quiet duration, the mobile application instructs the control module in the adjustable bed to reposition the adjustable sleeping surface back to a flat position.

15. An anti-snoring, sleep improvement system, comprising:
(a) an adjustable sleeping surface that may be mechanically raised or lowered, and wherein the adjustable sleeping surface includes a control module adapted to receive commands from a source external to the adjustable sleeping surface;
(b) a mobile device, wherein the at least one mobile device is a smartphone that is in direct or indirect communication with the control module in the adjustable sleeping surface, and wherein the smartphone has sound recording capabilities;
(c) a mobile application resident on the smartphone, wherein the mobile application includes sound data collection algorithms, system control algorithms, and a sound database operative to determine whether or not a person on the adjustable sleeping surface is snoring, wherein the mobile application is either an Android-based application or an iOS-based application, and wherein the sound data collection algorithms comprise a 1D convolution layer, a batch normalization layer, and a Relu6 activation layer; and
(d) upon a determination that the person is snoring and has been snoring for a predetermined period of time, the mobile application instructs the control module in the adjustable sleeping surface to reposition the sleeping surface to discourage or stop the person from snoring.

16. The system of claim 15, wherein the adjustable sleeping surface is mounted on a bed frame.

17. The system of claim 15, wherein the sound data collection algorithms, system control algorithms, and sound database comprise a neural network.

18. The system of claim 15, wherein the direct communication between the mobile device and control module is Bluetooth®-based or Wi-Fi based.

19. The system of claim 15, wherein after an allowable quiet duration, the mobile application instructs the control module in the adjustable sleeping surface to reposition the adjustable sleeping surface back to a flat position.

* * * * *